Patented Oct. 16, 1928.

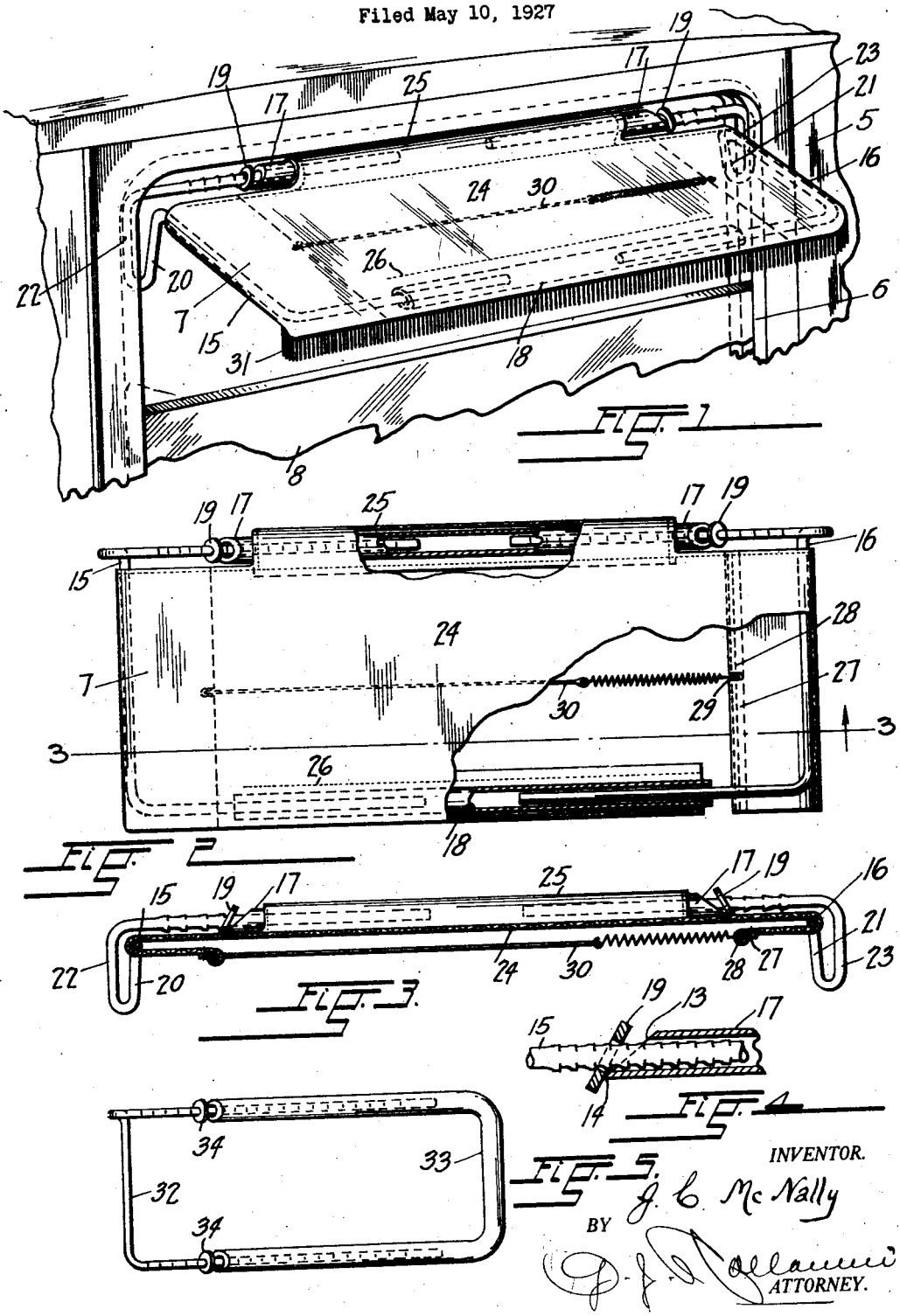

1,687,874

UNITED STATES PATENT OFFICE.

JOSEPH C. McNALLY, OF DENVER, COLORADO, ASSIGNOR OF ONE-HALF TO ROBERT B. ELDREDGE, OF DENVER, COLORADO.

ADJUSTABLE FASTENING MEANS.

Application filed May 10, 1927. Serial No 190,247.

My invention relates to adjustable fastening means, the principal object of which is to provide a simple, strong fastening having relatively adjustable members and novel means for locking them automatically by movement of one member relative to the other.

An embodiment of my invention has been shown in the accompanying drawings in connection with an automobile awning, but of course its use is not restricted to this particular field.

An object in applying the invention to automobile awnings is to provide a wide adjustment to fit automobile window casings of different sizes, and to hold the awning tight in the desired position.

In the accompanying drawings, in which like characters of reference designate the same parts throughout the several views.

Figure 1 represents a perspective view of an automobile awning containing the features of the present invention, the awning being in position in an enclosed automobile window casing;

Figure 2, a broken plan view of an awning such as shown in Figure 1;

Figure 3, a sectional view taken along the line 3—3 of Figure 2;

Figure 4, an enlarged sectional view of the principal elements of the present invention; and Figure 5, a plan view on a reduced scale, of a modified form for an automobile awning frame.

Referring more specifically to the drawings the reference numeral 5 represents the body of an automobile, in a window casing 6 of which an automobile awning 7 embodying the features of the invention has been placed. The automobile window has been illustrated at 8.

The principal elements of the present invention comprise a knurled rod 15, a tube 17 and a washer 19. The end of the tube 17 is cut at an oblique angle, as at 13, as best shown in Figure 4, to form a point 14. The hole of the washer is larger than the diameter of the male member of the fastening on which it is placed. The angle at which the end of the female member is cut is less than the angle of the washer on the male member when it is placed in binding relation thereto.

Therefore the point 14 of the tube when moved along the rod pushes the washer to a slanting position, as shown in said figure, so that the washer 19 will engage the knurls on the rod. The knurls are preferably placed in such positions that the washer will engage a knurl on either side of the rod when pushed into position by the point 14 of the tube, as shown in this figure.

In applying the afore-described invention to an automobile awning, a frame, composed of two substantially U-shaped members 15 and 16 fitted together in tubes 17 and 18, is provided. The ends of the tubes 17 are cut at an oblique angle. The U-shaped members 15 and 16 are knurled on the ends inserted in the tube 17. Washers 19 are provided on said knurled ends to hold the awning 7 in any adjusted position.

The other tube 18 provides a sleeve for the opposite ends of the U-shaped members. The members 15 and 16 have loops 20 and 21. These loops have bearing surfaces 22 and 23 to engage the casing 6 of the automobile window 8. In addition, the loops 20 and 21 furnish a resilient resistance, to keep the loops in position and to keep the tubes 17 tight against the washers 19. The members 15 and 16 slip in and out of the sleeve 18 freely to automatically maintain the frame in a rectangular condition.

A covering 24 is supported on the frame. Hems 25 and 26 are formed in the sides of the covering 24 for the tubes 17 and 18 respectively. The ends of the covering lap over the cross rods of the U-shaped members. Hems 27 are provided in said ends of the covering for cross bars 28. Openings 29 in the hems expose the cross bars 28, and a spring controlled connection 30 between the exposed portions of the cross bars, maintains the covering 24 taut across the frame. The covering is shown as having a fringe 31.

A modified form for a frame is shown in Figure 5. The frame here consists of two U-shaped members, one a rod 32 knurled at each end and the other a tube 33 cut at an oblique angle at each end. The washers 34 are on the knurled rod as before.

In the operation of the present invention, the tube 17 and rod 15 are adjusted to the desired position relative to each other. The washer 19 is then moved along the rod to a position adjacent to the tube. Thus when force is applied to either the rod or the tube, or both, tending to telescope them, the point 14 of the tube pushes the washer 19 so that an inner edge thereof engages a knurl on the rod, thus holding the rod and tube against the applied force.

In an automobile awning, the loops 20 and 21 are placed in the casing 6 of the automobile window and the U-shaped members 15 and 16 are pushed apart against the spring action in said loops. The fastening means is then adjusted as explained in the preceding paragraph and the awning is held in position until the washer is released from the knurl it is engaging.

It is to be understood that the knurled form as shown and described is preferable, but any shoulder on the male member that is adapted to be engaged by the washer through the instrumentality of the point of the female member will produce the desired effect. Therefore the use of the word "knurl" in this description and the hereunto appended claims should not be considered as being limited to any particular form, but to include any shoulder, indentation or protuberance that is adapted to be engaged by the washer and to place it in a locking position.

In the modified form shown in Figure 5, the washers 34 hold the tube 33 and the rod 32 in position by the means explained.

What I claim and desire to secure by Letters Patent is:—

1. A device of the character described comprising a member having an open end, a knurled member adapted to enter said open end, and a washer on the last-mentioned member adapted to engage a knurl thereof when engaged by the open-ended member.

2. A device of the character described comprising an open-ended member, one end of which being cut at an angle to provide a projection, a knurled member adapted to enter said open end, and a washer on the knurled member, the least possible angle between the washer and the knurled member being greater than the angle at the end of the open-ended member, the projection on the first-mentioned member being adapted to engage the washer and push same against a knurl.

3. A device of the character described comprising a member having a pointed, open end, a knurled member adapted to enter said open end, and a washer on the last-mentioned member adapted to engage a knurl thereof when engaged by the point on the open-ended member.

4. An automobile awning comprising a frame, an adjusting means in the frame comprising a member having a pointed open end, a knurled member adapted to enter said open end, and a washer on the knurled member adapted to engage a knurl when engaged by the point on the first mentioned member, and a covering for the frame.

5. An automobile awning comprising a frame having separate knurled ends, a tube pointed and open at its ends, the knurled ends of the frame being adapted to be inserted in the open ends of the tube, washers on the knurled ends adapted to engage a knurl thereof when engaged by the pointed ends of the tube, and a covering on the frame.

6. A device of the character described comprising a male member, a washer on said member adapted to be moved to an oblique binding position with relation thereto, and a female member having a pointed end adapted to move the washer to said position, when the male member is inserted in the female member.

In testimony whereof I have affixed my signature.

JOSEPH C. McNALLY.